US006675065B2

(12) United States Patent
Foth et al.

(10) Patent No.: US 6,675,065 B2
(45) Date of Patent: Jan. 6, 2004

(54) METHOD FOR TAGGING MAIL

(75) Inventors: Thomas J. Foth, Trumbull, CT (US); Kenneth G. Miller, Bethel, CT (US); Richard W. Heiden, Huntington, CT (US); Brian M. Romansky, Monroe, CT (US); Kwan Cheung Wong, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 44 days.

(21) Appl. No.: 10/136,130

(22) Filed: May 1, 2002

(65) Prior Publication Data

US 2003/0083780 A1 May 1, 2003

Related U.S. Application Data

(60) Provisional application No. 60/329,924, filed on Oct. 16, 2001.

(51) Int. Cl.[7] .................................................. G06F 7/00
(52) U.S. Cl. ......................... 700/227; 209/3.3; 118/712
(58) Field of Search ................................ 700/224, 225, 700/226, 227, 215; 118/712; 209/3.3; 427/284, 285

(56) References Cited

U.S. PATENT DOCUMENTS

| | | | | |
|---|---|---|---|---|
| 1,806,583 A | * | 5/1931 | Boorman | 427/285 |
| 4,085,597 A | * | 4/1978 | Kamikura et al. | 66/75.2 |
| 5,005,124 A | | 4/1991 | Connell et al. | 364/401 |
| 5,104,681 A | | 4/1992 | Sansone | 427/8 |
| 5,270,938 A | | 12/1993 | Sansone et al. | 364/464.02 |
| 5,419,440 A | | 5/1995 | Picoult | 209/583 |
| 6,275,745 B1 | * | 8/2001 | Critelli et al. | 700/227 |

* cited by examiner

*Primary Examiner*—Joseph E. Valenza
*Assistant Examiner*—Richard Ridley
(74) *Attorney, Agent, or Firm*—Ronald Reichman; Angelo N. Chaclas

(57) ABSTRACT

A method for tagging the mail pieces in a mail tray and validating the integrity of the mail pieces in the tray. The method is accomplished by: determining the measurement of an edge of each mail piece that will be placed in a tray; determining the thickness of each mail piece that will be placed in the tray; determining the number of mail pieces that will be placed in the tray; calculating an incremental pattern dab that is going to be placed on the edge of each mail piece; placing a portion of the pattern on the edge of each mail piece that is going to form the mail pieces of the tray; and placing the mail pieces in the tray in an ordered manner so that the edges having dabs will be visible, and the dabs will form a pattern that indicates only the determined number of mail pieces are in the tray.

19 Claims, 14 Drawing Sheets

136 137 138 139

Mailer's Name: Bulk Mailing, Inc.
Address: 35 Waterview Dr

Date of Manifest: 3/27/2002
Post Office of Mailing: Shelton, CT
Permit Number: 96
Processing Category: MIXED
MAC Gold Product Name/ Version Number: My Manifesting Software / 4.56

Manifest Sequence Number: 123

| Piece ID Number | Pieces | Confirmation Number | 3- Digit ZIP Code | Zone | Weight (lbs) | Class Rate | Fee | Postage | Cumulative Postage |
|---|---|---|---|---|---|---|---|---|---|
| 140 1298 – 1598 | 521 | | 97000 | 4 | .06 | .233 | | 121.39 | 121.39 |
| 141 1599 – 1845 | 246 | | 94600 | 4 | .11 | .46 | | 113.16 | 185.16 |
| Totals: | 767 | | | | 58.32 | | | | 306.55 |

Tray Image

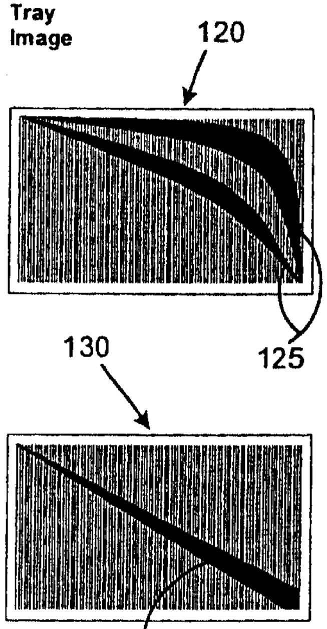

FIG. 13

METHOD FOR TAGGING MAIL

This Application claims the benefit of the filing date of U.S. Provisional Application No. 60/329,924 filed Oct. 16, 2001, which is owned by the assignee of the present Application.

CROSS REFERENCE TO RELATED APPLICATIONS

Reference is made to commonly assigned copending patent application Docket No. F-480 filed herewith entitled "A Method For Printing A Manifest Or Statement Of Mailing Having A Pattern That Matches A Pattern Printed On The Edges Of Mail Pieces Contained In A Tray" in the names of Kenneth G. Miller, Thomas J. Foth, Brian M. Romansky, Richard W. Heiden and Ronald Reichman.

FIELD OF THE INVENTION

The invention relates generally to the field of mailing systems and, more particularly, to systems for tagging mail.

BACKGROUND OF THE INVENTION

Initially, the processing of mail involved a mailer dropping letters or mail pieces into a mail box, having the post office pick up the mail from the mail box, transporting the mail to a post office and dispatching the mail to its ultimate destination, whether this destination be local or out of town. As time progressed, large mailers would deliver the mail directly to the post office where the mail would be inspected, sorted and forwarded. The post office found that if the mailers were given postal discount rates for performing certain acts, such as the presorting of mail, i.e., by zip code, bundling the mail and the like, a great deal of time would be saved by the post office. As a result of such discounting, large mailers were encouraged to preprocess their mail, and mail processing equipment such as scales, inserters, folders, sorters and the like were developed to assist the mailer in their mailing operation.

Mailing equipment has been developed to accomplish the foregoing. In equipment for processing large amounts of mail, it is frequently a practice to determine the weight of inserts of a mail piece, and together with the weight of the envelope, the total weight of the mail piece is calculated and postage paid in accordance with the calculated weight. The mail pieces are placed in trays, and these trays are delivered to the post office. Sometimes the mailing equipment, mailing software, or the mailer produced written records automatically or manually indicating information about the mail pieces in the tray. The post office verified written documentation supplied by the mailer by randomly sampling the mail pieces in trays to determine if the correct postage was paid.

Some mailers practiced a procedure known as "salting". The practice involved inserting mail pieces into the tray for which no postage was paid. Salting has caused the post office to loose a great deal of funds.

Another problem encountered by the prior art resulted when one or more mail trays dropped, and the contents of the mail trays were no longer in order. A large amount of labor was required to properly re-order the mail pieces in the dropped trays, or the post issued discounts for mailer tasks that were not performed by the mailer.

An additional problem encountered by the prior art was that, oftentimes, personnel placed tray label tags on the incorrect tray.

SUMMARY OF THE INVENTION

This invention overcomes the disadvantages of the prior art by utilizing a method that improves the post office's ability to verify the mail pieces in a tray and reduce the ability of someone to insert mail pieces into a tray for which no postage is paid. The invention also insures the integrity of mail trays and makes it easier to place mail pieces in the tray after the mail pieces have fallen from the tray. This invention also makes it easier for personnel to place the proper tray label tag on the proper tray.

The foregoing is accomplished by: determining the measurement of an edge of each mail piece that will be placed in a tray; determining the thickness of each mail piece that will be placed in the tray; determining the number of mail pieces that will be placed in the tray; calculating an incremental pattern dab that is going to be placed on the edge of each mail piece; placing a portion of the pattern on the edge of each mail piece that is going to form the mail pieces of the tray; and placing the mail pieces in the tray in an ordered manner so that the edges having dabs will be visible, and the dabs will form a pattern that indicates the determined number of mail pieces are in the tray in the correct order. The pattern for each mail tray is added to each mail tray is added to and saved in a mail manifest or a statement of mailing. The mail manifest or statement of mailing will subsequently submitted to the post.

BRIEF DESCRIPTION OF THE DRAWINGS

FIG. 13 is a drawing of a mail manifest 136 that has images of the patterns placed on the mail pieces contained in trays 120 and 130.

DETAILED DESCRIPTION OF THE PREFERRED EMBODIMENT

Figure 1:
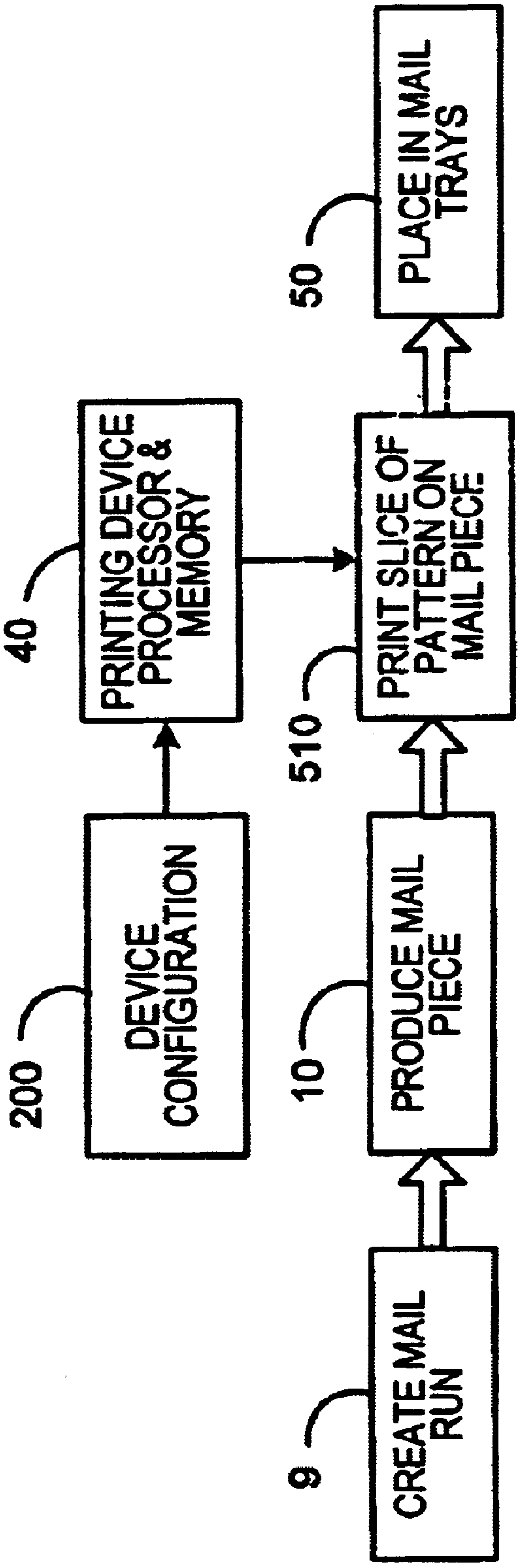
FIG. 1 is a block diagram showing the environment of this invention.

Referring now to the drawings in detail, and more particularly to FIG. 1, the reference character 9 represents a process for creating mail pieces in a mail run. Mail run 9 may be the StreamWeaver® software sold by Pitney Bowes Inc. of One Elmcroft Road, Stamford, Conn. Then the mail pieces are produced in block 10, i.e., the contents of the mail piece are folded, inserted and sealed into the mail piece, which is addressed, and an indication of postage payment is placed on the mail piece. Next the configuration information from blocks 200 (blocks 200 will be described in the description of FIG. 9) is stored in printing device and processor & memory 40. Then a slice of a pattern is printed on the mail piece in block 510 (block 510 will be described in the description of FIG. 10). In block 50, the mail pieces are placed in mail trays.

Figure 2:
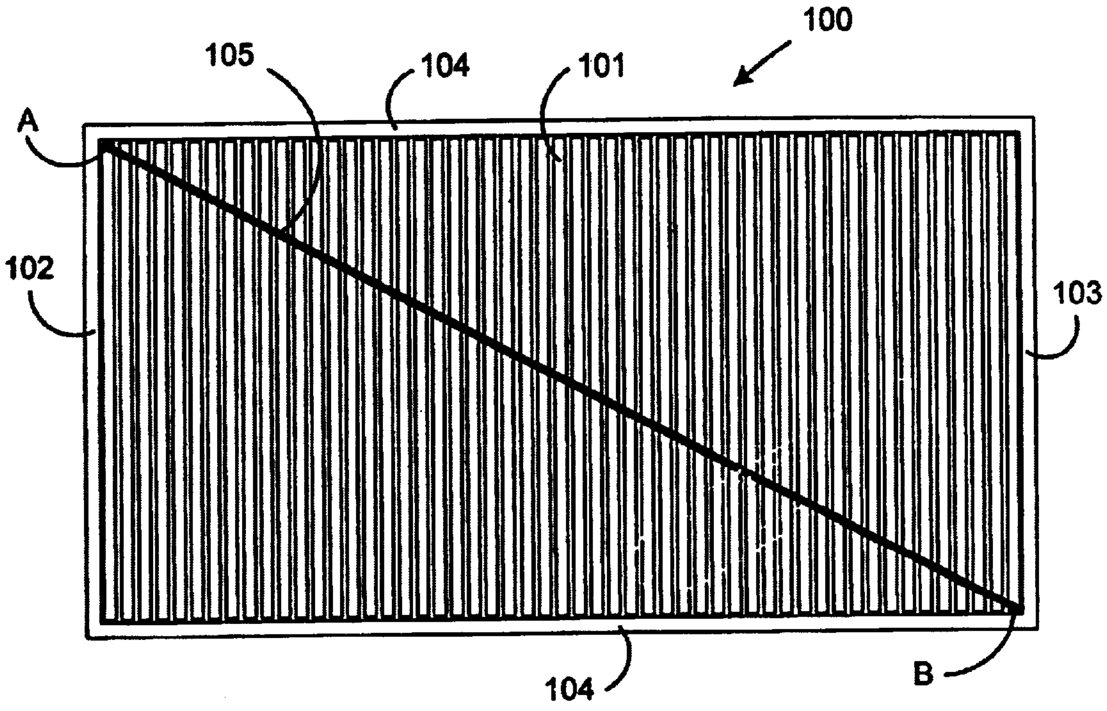
FIG. 2 is a drawing of a top view of a mail tray containing mail pieces that have a pattern in the form of a diagonal line drawn along the top edge of the mail pieces.

FIG. 2 is a drawing of a top view of a mail tray containing mail pieces that have a pattern in the form of a diagonal line drawn along the top edge of the mail pieces. Mail tray 100 contains a plurality of mail pieces 101 that are placed in tray 100 in a manner that one of the edges of mail pieces 101, preferably the top edge of mail pieces 101 run along the top of tray 100. Tray 100 has a front panel 102, a back panel 103, and side panels 104 as well as a bottom panel (not shown). Mail pieces 101 have been placed in tray 100 in ordered sequence that was determined by create mail run 9 (FIG. 1). Pattern 105 was drawn on mail pieces 101 by printing device 40 (FIG. 1) in a manner that the first mail piece 101 in the ordered sequence is flush with front panel 102, and the last mail piece in the ordered sequence is flush with back panel 103. Pattern 105 forms a continuous solid diagonal line from point A on the first mail piece next to panel 102 to point B on the mail piece next to panel 103; thus, no mail pieces 101 have been added or removed from tray 100. Hence, mail pieces 101 are in the same sequence order that was determined by create mail run 9.

Figure 3:
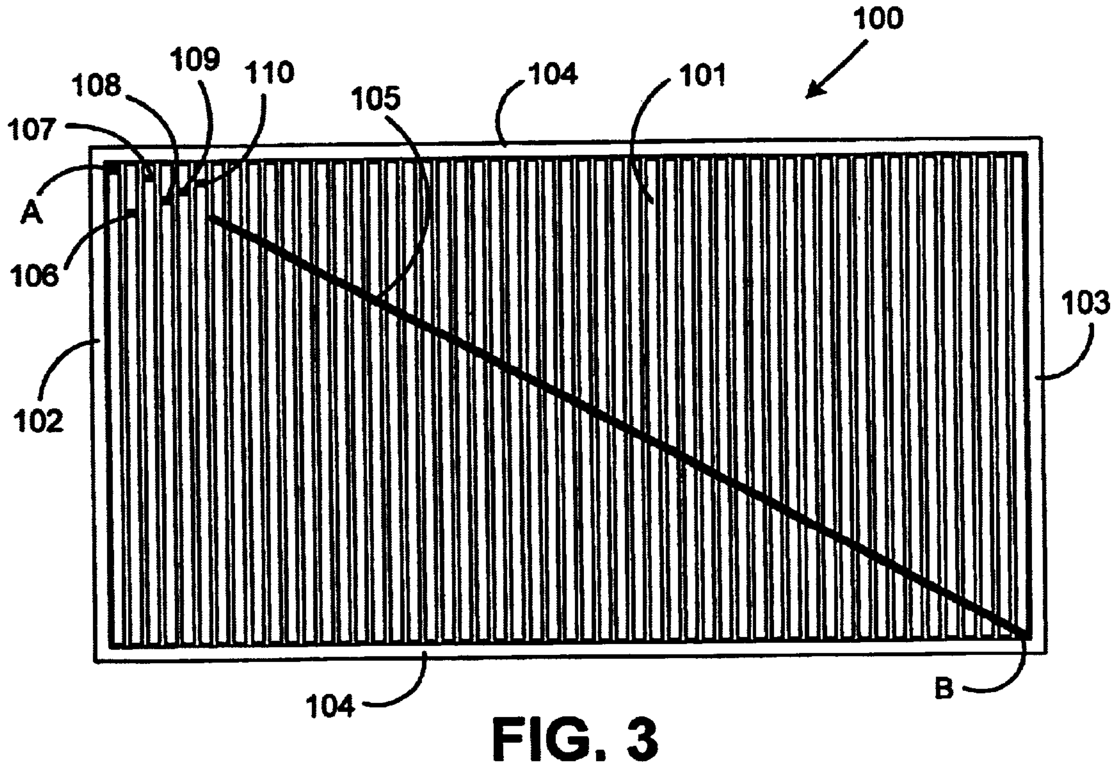
FIG. 3 is a drawing of mail tray 100 shown in FIG. 2 with some mail pieces 101 not in the correct sequence order.

FIG. 3 is a drawing of mail tray 100 shown in FIG. 2 with some mail pieces 101 not in the correct sequence order. Pattern 105 does not form a continuous diagonal line from point A on the first mail piece next to panel 102 to point B on the mail piece next to panel 103. Thus, mail pieces 101 are not in the same sequence order that was determined by create mail run 9. It is apparent that mail pieces 101 having dabs 106, 107, 108, 109 and 110 are not properly positioned in tray 100. One may easily reposition mail pieces 101 having dabs 106–110 within tray 100 so that pattern 105 forms a continuous diagonal line from point A on panel 102 to point B on panel 103.

Figure 4:
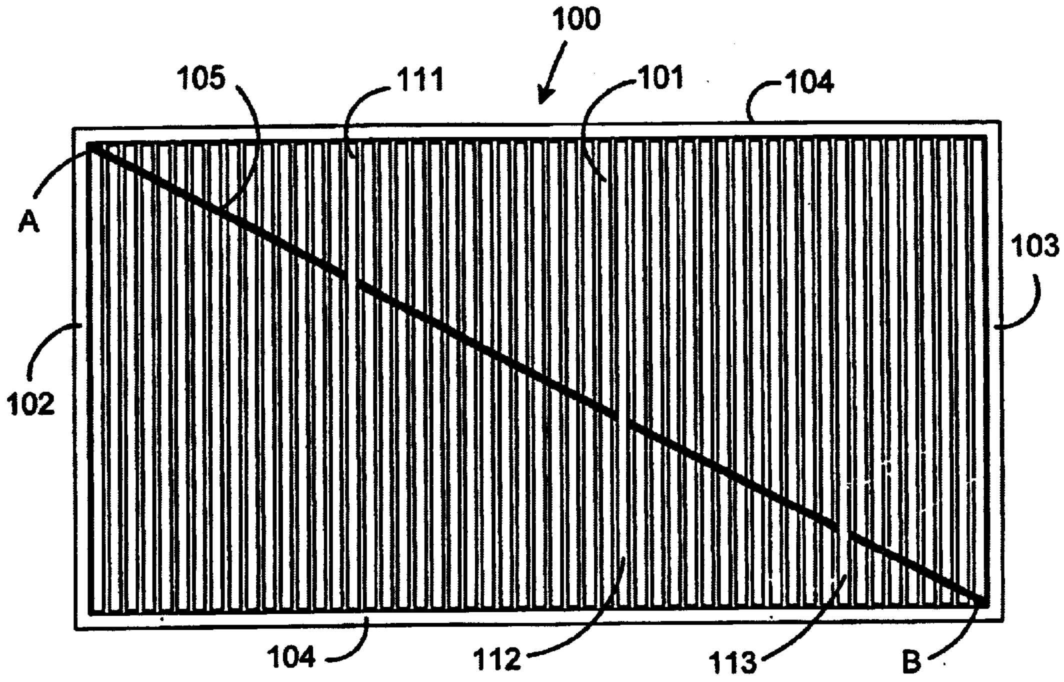
FIG. 4 is a drawing of mail tray 100 shown in FIG. 2 with mail pieces 111, 112 and 113 added to tray 100 after the sequence order was determined by create mail run 9 of FIG. 1.

FIG. 4 is a drawing of mail tray 100 shown in FIG. 2 with mail pieces 111, 112 and 113 added to tray 100 after the sequence order of mail pieces 101 was determined by create mail run 9. Mail pieces 111, 112 and 113 have no dabs on their top edges. Thus, the insertion of mail pieces 111–113 in tray 100 breaks the continuous solid diagonal line formed by pattern 105.

Figure 5:
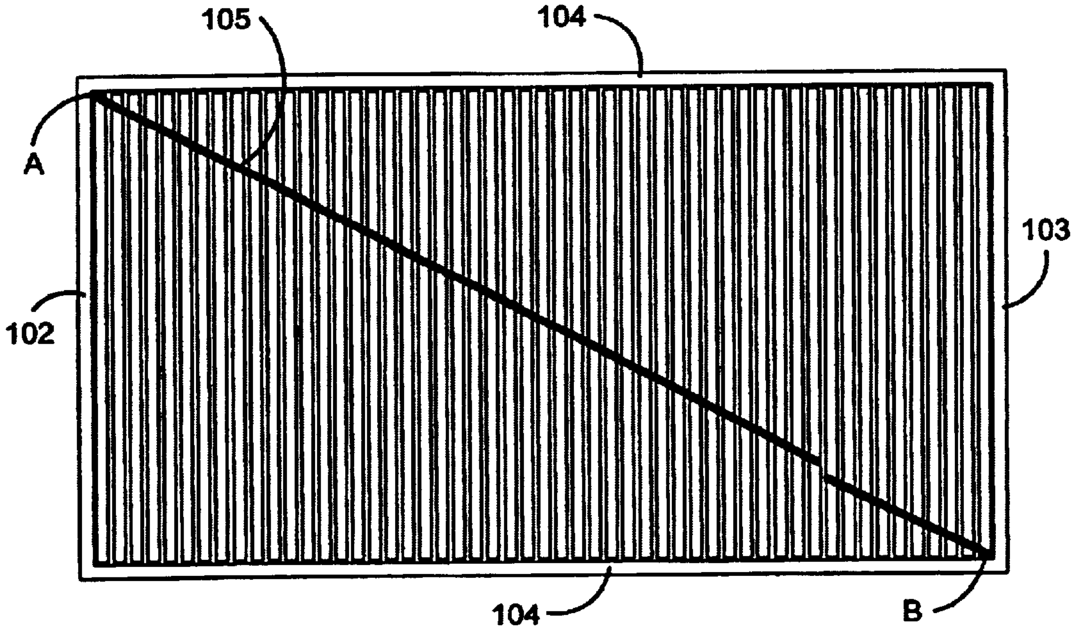
FIG. 5 is a drawing of mail tray 100 shown in FIG. 2 with one or more mail pieces 101 being removed from tray 100 after the sequence order was determined by create mail run 9 of FIG. 1.

FIG. 5 is a drawing of mail tray 100 shown in FIG. 2 with one or more mail pieces 101 being removed from tray 100 after the sequence order was determined by create mail run 9. Pattern 105 does not form a continuous solid diagonal line from point A on panel 102 to point B on panel 103

Figure 6:
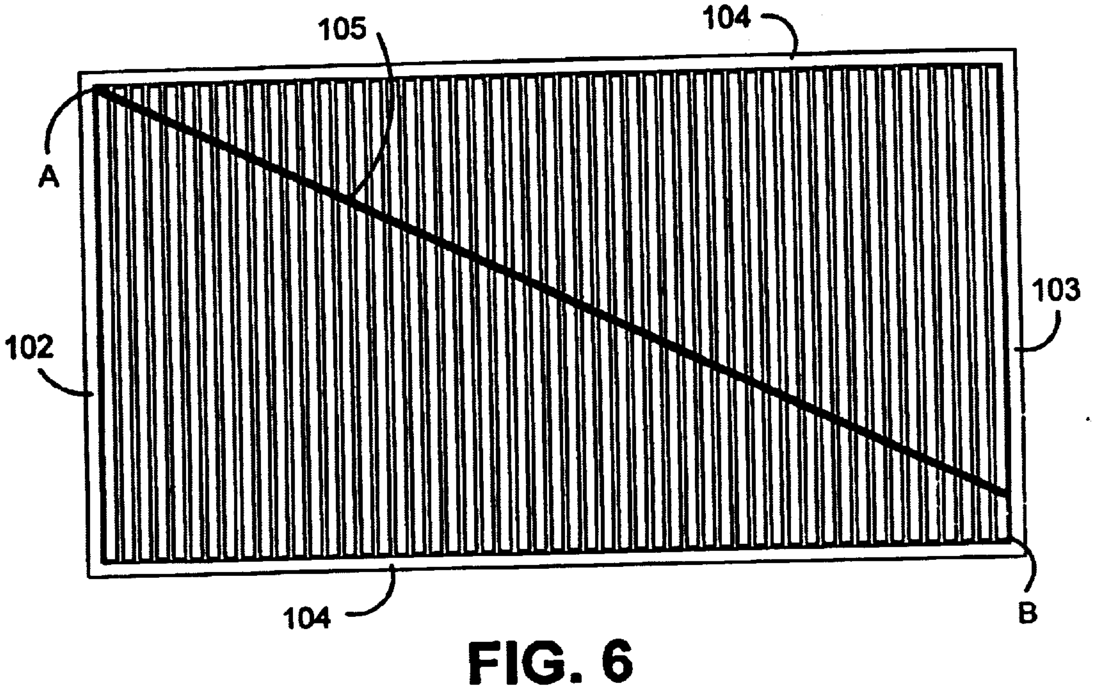
FIG. 6 is a drawing of mail tray 100 shown in FIG. 2 with some mail pieces missing from tray 100.

FIG. 6 is a drawing of mail tray 100 shown in FIG. 2 with some mail pieces 101 missing from tray 100. Pattern 105 does not form a continuous solid diagonal line from point A on panel 102 to point B on panel 103.

Figure 7:
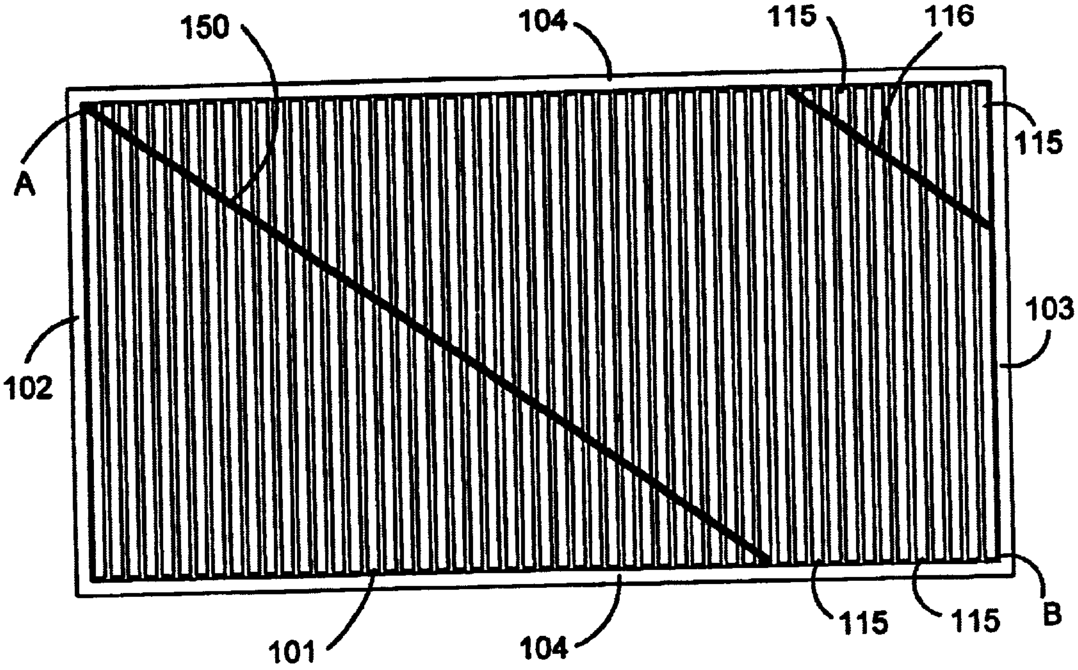
FIG. 7 is a drawing of mail tray 100 shown in FIG. 2 with additional mail pieces 101 from another tray being placed in tray 100.

FIG. 7 is a drawing of mail tray 100 shown in FIG. 2 with additional mail pieces 115 from another tray being placed in tray 100. Additional mail pieces 115 are mail pieces that have been identified in the written record submitted to the post office of the mail pieces placed in tray 100. Pattern 105 does not form a continuous solid diagonal line from point A on the first mail piece next to panel 102 to point B on the mail piece next to panel 103. A line 116 is shown; thus, tray 100 has been salted or mistrayed.

Figure 8:
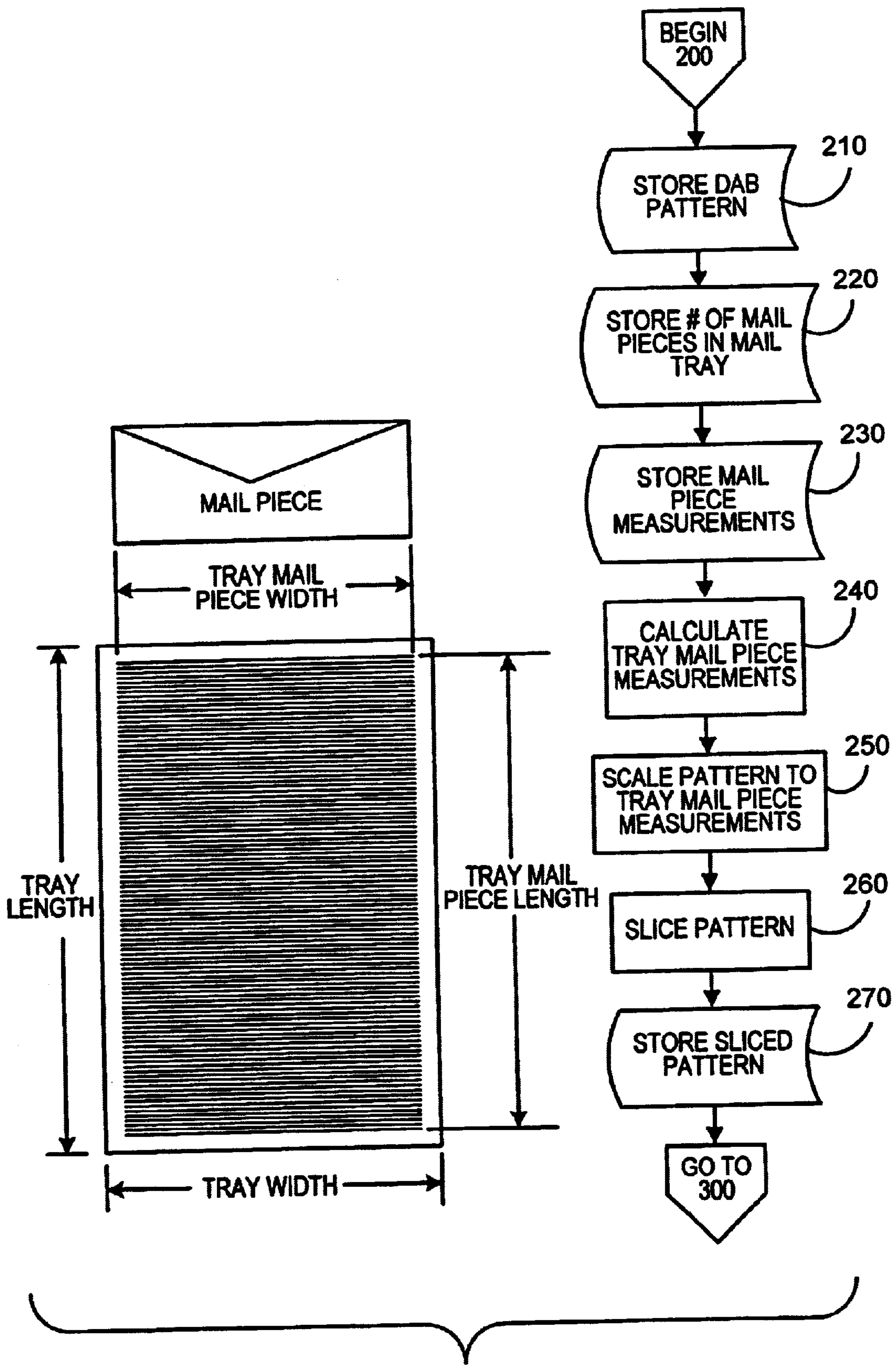
FIG. 8 is a drawing of a flow chart of configuration block 200 of FIG. 1.

FIG. 8 is a drawing of a flow chart of configuration blocks 200 of FIG. 1. The program begins in block 200. Then the dab pattern that is going to be printed on the mail pieces that are placed in mail trays is stored in block 210. Next the number of mail pieces that are going to be placed in the mail tray is stored in block 220. Now the mail piece measurement, i.e., width and thickness, are stored in block 230. At this point, the tray mail piece measurements are calculated in block 240, i.e., the length of the mail tray equals a summation of each mail piece thickness multiplied by the number of mail pieces having that thickness in the tray. Then the program goes to block 250, where the scale pattern to tray mail piece measurements is determined, i.e., pattern measurements equal tray mail piece measurements. Next, the slice pattern is determined in block 260, i.e., the number of slices equals the number of mail pieces, slice width equals mail piece width, and slice thickness equals mail piece thickness. The slice pattern is then stored in block 270. At this point the program goes to block 300 (FIG. 9).

Figure 9:
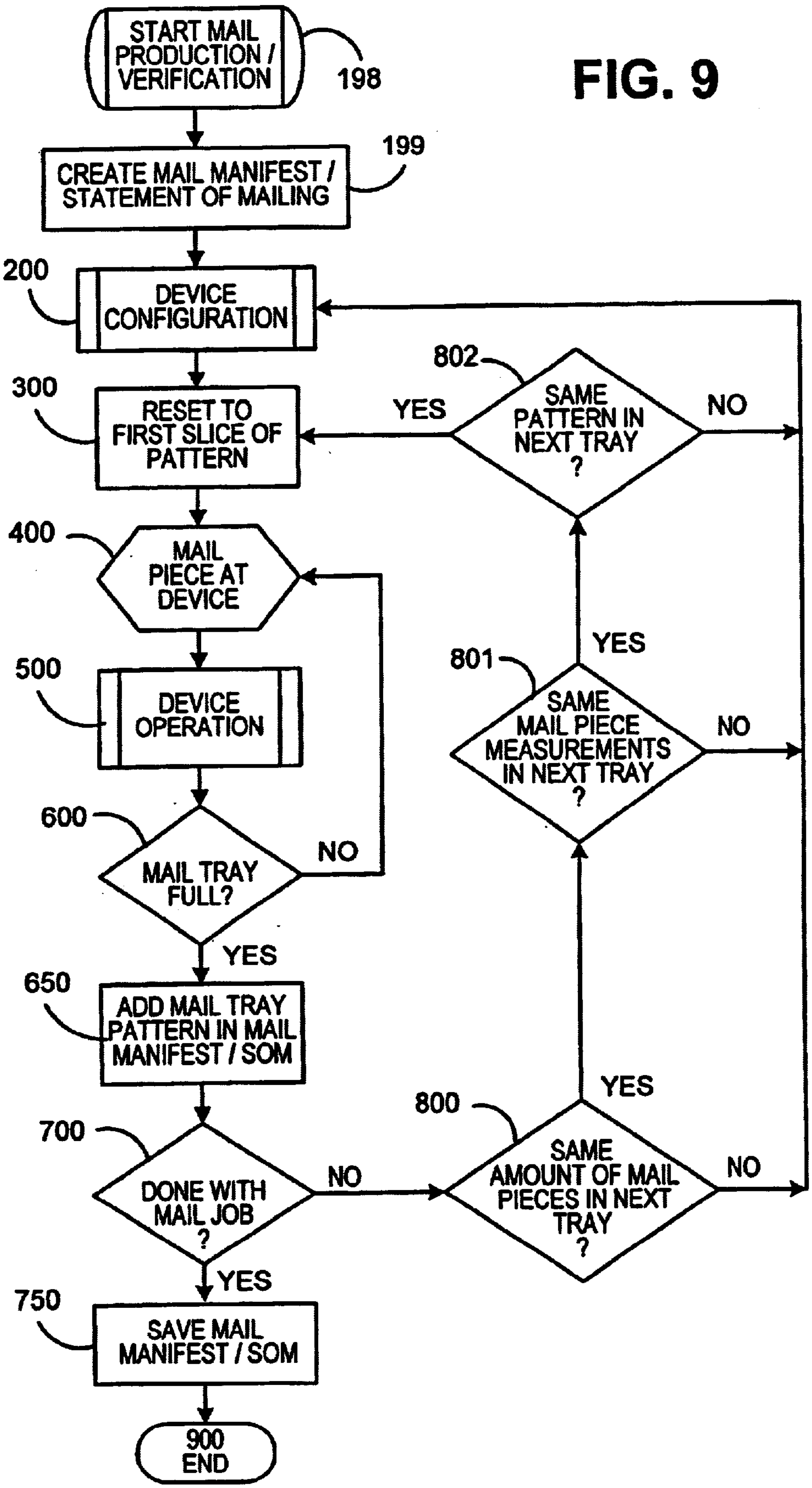
FIG. 9 is a drawing of a flow chart showing the operation of this invention.

FIG. 9 is a drawing of a flow chart showing the operation of this invention.

The program begins in block 198 start mail production/verification. Next the program goes to block 199 to create a mail manifest or statement of mailing using the Firstlogic Postalsoft® suite software sold by Firstlogic of 100 Harborview Plaza, Lacrosse, Wis. 54061. Then, the program goes to block 200 to configure printing device 40. Now the program goes to block 300 to reset to the first slice of the pattern that is going to be printed on the edges of mail pieces that are going to be placed in mail trays. Then the program goes to block 400 to see if a mail piece is at printing device 40. If block 400 determines that a mail piece is at printing device 40, then the program goes to the input of block 500 entitled device operation, which is described in the description of FIG. 10. Next the program goes to the input of decision block 600. Block 600 determines whether or not a mail tray is full. If block 600 determines that a mail tray is not full, the program goes back to block 400. If block 600 determines that a mail tray is full, the program goes to block 650 to add the pattern for this mail tray in the mail manifest or statement of mailing. Next the program goes to decision block 700. Decision block 700 determines whether or not the mail job has been completed. If block 700 determines that the mail job has not been completed, the program goes to decision block 800. Decision block 800 determines whether or not the same amount of mail pieces is in the next mail tray. If block 800 determines that the same number of mail pieces are not in the next mail tray, the program goes back to block 200. If block 800 determines that the same number of mail pieces are in the next mail tray, the program goes to block

801. Decision block 801 determines whether or not the same mail piece measurements in the next mail tray are the same as the mail piece measurements in the preceding tray. If block 801 determines that the mail piece measurements in the next mail tray are not the same as the mail piece measurements in the preceding tray, the program goes back to block 200. If block 801 determines that the mail piece measurements in the next mail tray are the same as the mail piece measurements in the preceding tray, the program goes to block 802. Decision block 802 determines whether or not the same mail piece pattern in the next mail tray is the same as the mail piece pattern in the preceding tray. If block 802 determines that the mail piece pattern in the next mail tray is not the same as the mail piece pattern in the preceding tray, the program goes back to block 200. If block 802 determines that the mail piece pattern in the next mail tray is the same as the mail piece pattern in the preceding tray, the program goes back to block 300. If block 700 determines that the mail job is completed, the program goes to block 750 to save the mail manifest or statement of mailing. Then the program ends in block 900.

Figure 10:
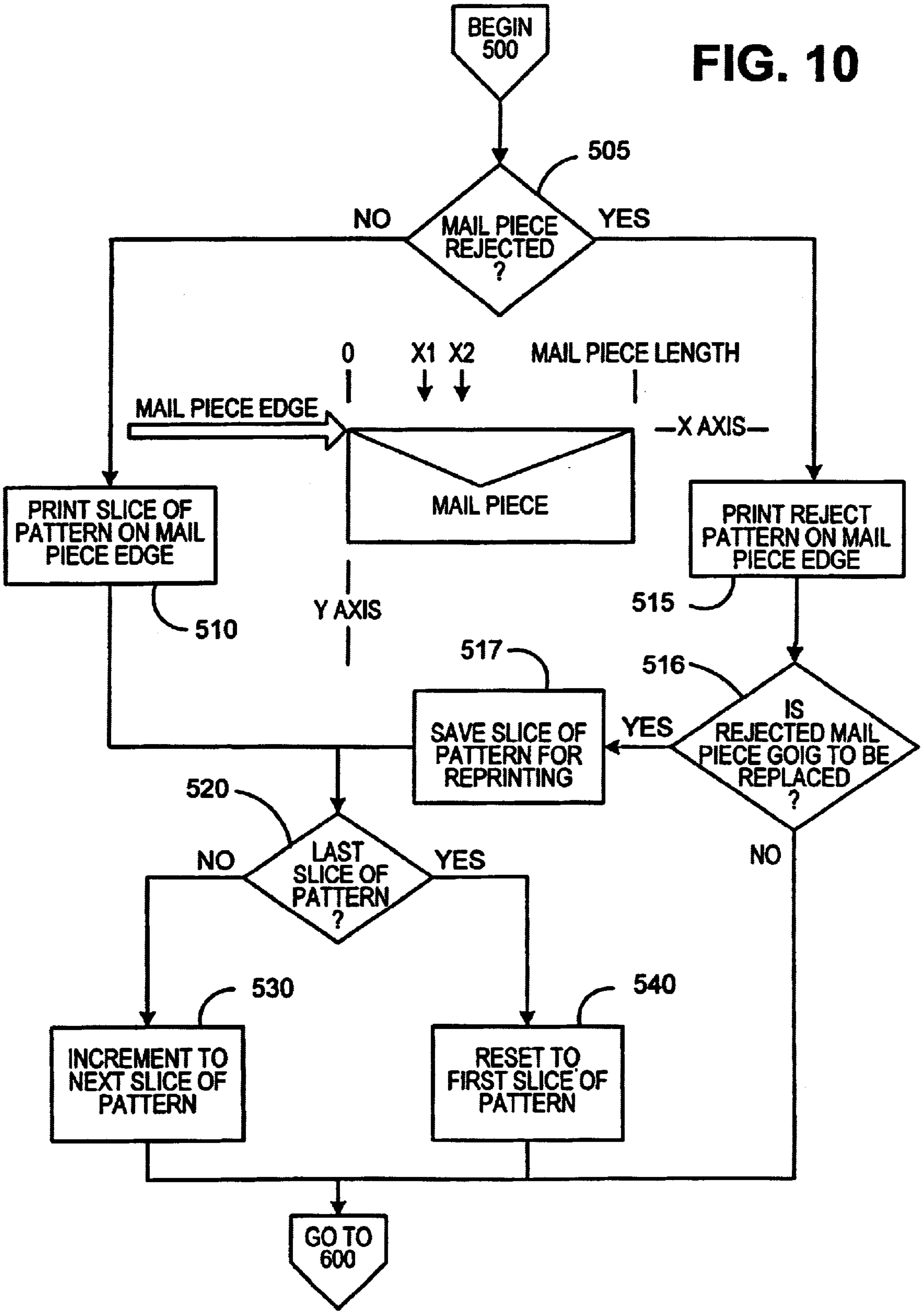
FIG. 10 is a drawing of a flow chart showing in detail the process that begins in block 500 (FIG. 9).

FIG. 10 is a drawing of a flow chart showing in detail the process that begins in block 500. Then the program goes to decision block 505 to determine whether or not a mail piece is rejected. If block 505 rejects a mail piece, the program goes to block 515 to print a reject pattern on the edge of the mail piece. Then the program goes to decision block 516 to determine whether or not the rejected mail piece should be replaced. If block 516 determines the mail piece should be replaced, the program goes to block 517 to save a slice for reprinting. Then the program goes to block 520. If block 516 determines the mail piece should not be replaced, the program goes to block 600 and ends. If block 505 does not reject a mail piece the program goes to block 510 to print a slice of a pattern on a mail piece. For purposes of illustration, assume that the print head of an ink jet printer moves along a bar that represents the X axis when printing a line. A roller mechanism exists along the Y axis, in an ink jet that is used to print multiple lines. The printer that is used hereunder to print a pattern on the edge of mail pieces will only need to deal with one axis. Since the mail pieces will be moving past the printing device, no transport mechanism is needed. The printer has to determine the velocity of the mail piece, the starting point of the mail piece, and the pattern coordinates that are on the mail piece, i.e., where the pattern coordinates are greater than or equal to mail piece length. The dab pattern may be printed by an ink jet printer or a dabber/roller. In the dabber approach, a slice of the pattern being printed will be printed on the edge of a mail piece from X1 to X2. The beginning of the mail piece is determined by coordinate 0. Then the dabber waits for the mail piece to be at X1, at which point the dabber is applied to the edge of the mail piece. When the mail piece reaches X2, the dabber is removed from the mail piece.

At this point, the program goes to decision block 520. Decision block 520 determines whether or not the last slice of the pattern has been printed on a mail piece. If block 520 determines that the last slice of the pattern has not been printed on a mail piece, the program proceeds to block 530. Block 530 increments to the next slice of the pattern. Then the program goes to block 600 (FIG. 9). If block 520 determines that the last slice of the pattern has been printed on a mail piece, the program proceeds to block 540 and resets to the first slice of the pattern. Then goes back to block 600 (FIG. 9).

Figure 11:
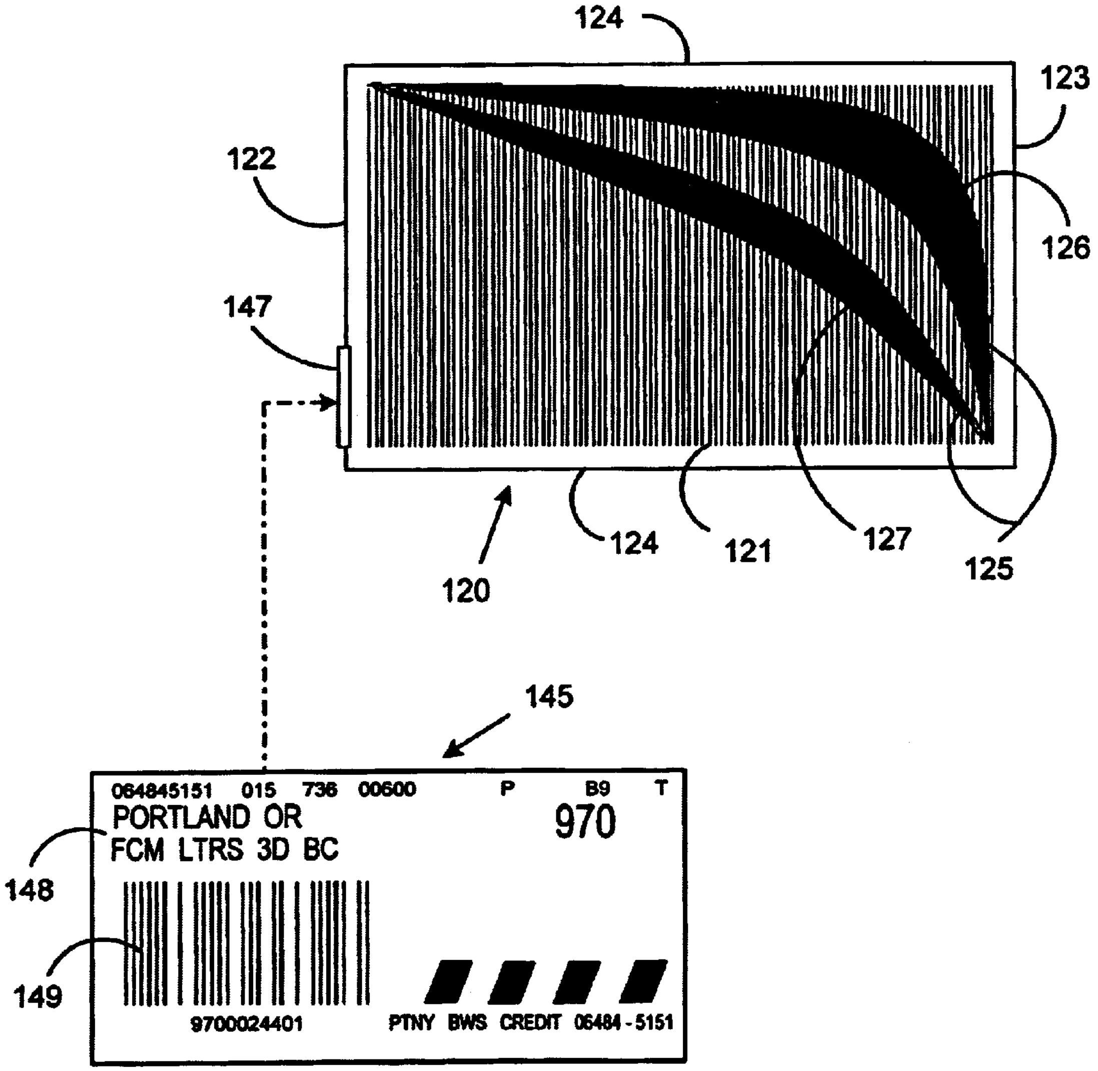
FIG. 11 is a top view of a mail tray containing mail pieces that have a pattern in the form of arched shaped sections drawn along the top edge of the mail pieces.

FIG. 11 is a top view of a mail tray containing mail pieces that have a pattern in the form of arched shaped sections drawn along the top edge of the mail pieces. Mail tray 120 contains a plurality of mail pieces 121 that are placed in tray 120 in a manner that one of the edges of mail pieces 121, preferably the top edge of mail pieces 121, run along the top of tray 120. Tray 120 has a front panel 122, a back panel 123, and side panels 124 as well as a bottom panel (not shown). Mail pieces 121 have been placed in tray 120 in ordered sequence that was determined by create mail run 9 (FIG. 1). Pattern 125 was drawn on mail pieces 121 by printing device 40 (FIG. 1) in a manner that the first mail piece 121 in the ordered sequence is flush with front panel 122, and the last mail piece in the ordered sequence is flush with back panel 123. Pattern 125 forms an arched section 126 and an arched section 127 on the mail pieces in mail tray 120. Thus, no mail pieces 121 have been added or removed from tray 120. Hence, mail pieces 121 are in the same sequence order that was determined by create mail run 9. Tray tag 145 is placed in tray holder 147 of front panel 122. Tag 145 indicates the destination 148 of tray 120. Bar code 149 indicates destination information about tray 120. Bar code 149 or tray label 145 may also be printed on the edges of mail pieces 121

Figure 12:
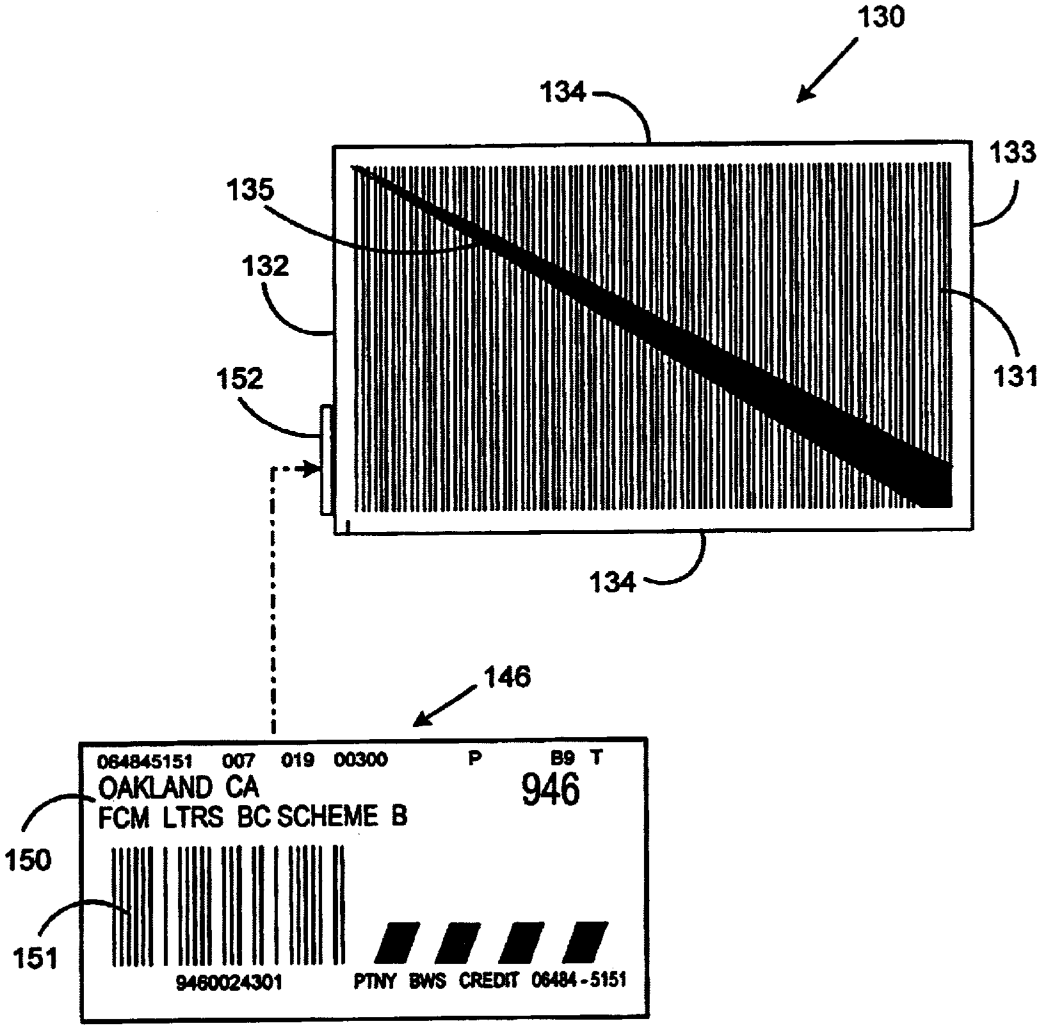
FIG. 12 is a top view of a mail tray containing mail pieces that have a pattern in the form of a triangle drawn along the top edge of the mail pieces.

FIG. 12 is a top view of a mail tray containing mail pieces that have a pattern in the form of a triangle drawn along the top edge of the mail pieces. Mail tray 130 contains a plurality of mail pieces 131 that are placed in tray 130 in a manner that one of the edges of mail pieces 131, preferably the top edge of mail pieces 131 run along the top of tray 130. Tray 130 has a front panel 132, a back panel 133, and side panels 134 as well as a bottom panel (not shown). Mail pieces 131 have been placed in tray 130 in ordered sequence that was determined by create mail run 9 (FIG. 1). Pattern 135 was drawn on mail pieces 131 by printing device 40 (FIG. 1) in a manner that the first mail piece 131 in the ordered sequence is flush with front panel 132, and the last mail piece in the ordered sequence is flush with back panel 133. Pattern 135 forms a triangle on the mail pieces in mail tray 130. Thus, no mail pieces 131 have been added or removed from tray 130. Hence, mail pieces 131 are in the same sequence order that was determined by create mail run 9. It would be obvious to one skilled in the art that different patterns may be drawn on the edges of mail pieces 131. Tray tag 146 is placed in tray holder 152 of front panel 132. Tag 146 indicates the destination 150 of tray 130. Bar code 151 indicates destination information about tray 130.

FIG. 13 is a drawing of a statement of mailing 136 that has images of the patterns 125 and 135, respectively, placed on the mail pieces contained in trays 120 and 130. The mailer's name and address is shown at area 137. Information regarding the manifest is shown in areas 138 and 139. Information regarding the mail pieces in tray 120 is shown in line 140, and information regarding the mail pieces in tray 130 is shown in line 141. Information regarding the tray label tag 145 for tray 120 is shown at 140, and information regarding the tray label tag 146 for tray 130 is shown at 141. Mailer personnel and post office personnel may check pattern 125 appearing on the mail pieces in tray 120 and pattern 125 appearing in the vicinity of 142 to place the proper tag on tray 120 and verify that tag 145 is on tray 120. Mailer personnel and post office personnel may also check pattern 135 appearing on the mail pieces in tray 130 and pattern 135 appearing in the vicinity of 143 to place the proper tag on tray 130 and verify that tag 146 is on tray 130. The foregoing makes it easier to match mail trays with tags. Thus, there will be less misdirected mail, and the post will find it easier to check that they receive the correct postage for delivering the mail.

Figure 14:
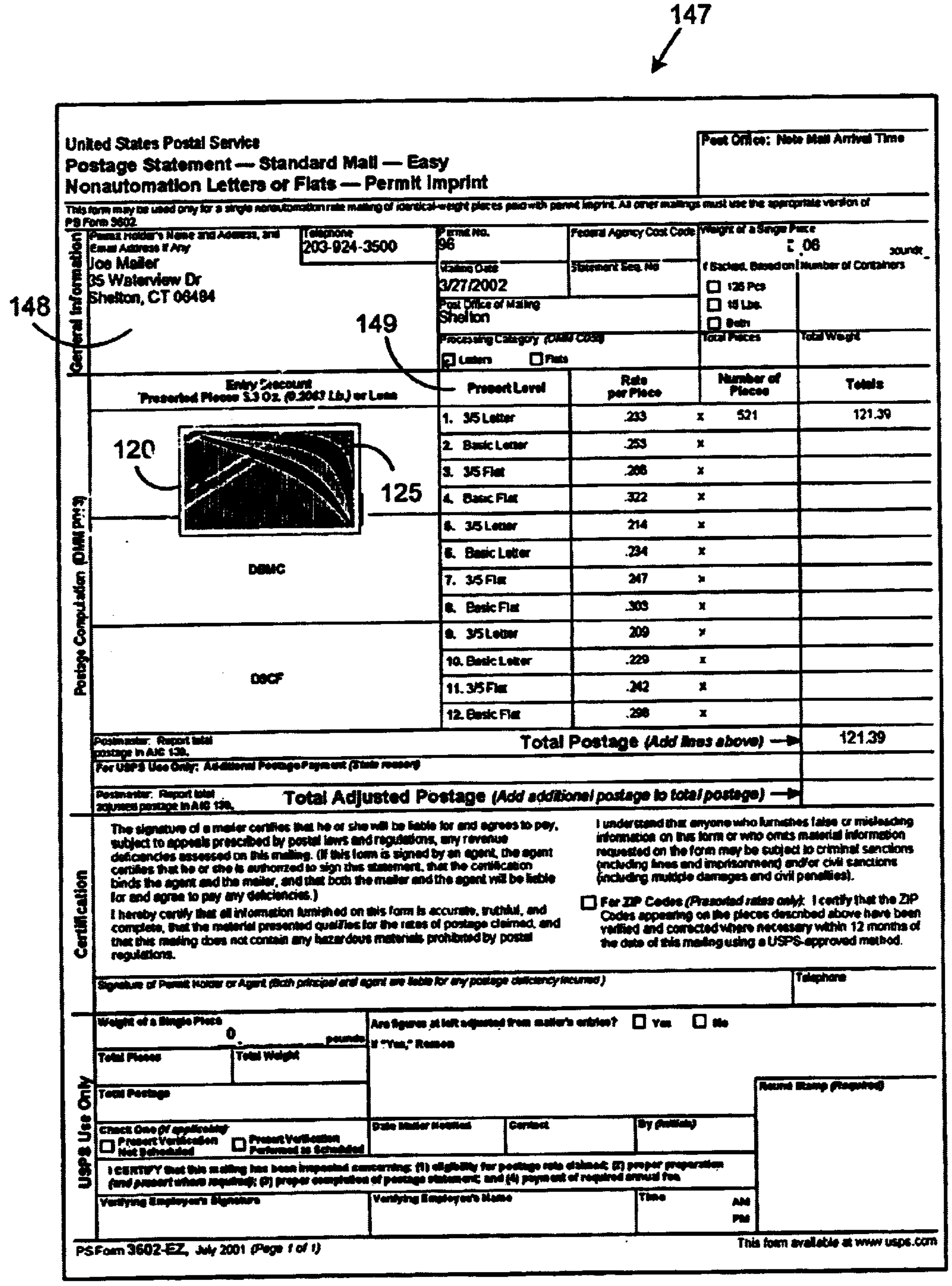
FIG. 14 is a drawing of a statement of mailing 147 that has an image of pattern that was placed on the mail pieces contained in tray 120.

FIG. 14 is a drawing of a statement of mailing 147 that has an image of pattern 125 that was placed on the mail pieces contained in tray 120. General information regarding the mailer is indicated in space 148. Information regarding the mail pieces in tray 120 is shown in area 149. Information regarding the tray label tag 145 for tray 120 is shown at 149. Mailer personnel and post office personnel may check pattern 125 appearing on the mail pieces in tray 120 and pattern 125 appearing in the vicinity of 149 to place the proper tag on tray 120 and verify that tag 145 is on tray 120. The foregoing makes it easier to match mail trays with tags. Thus, there will be less misdirected mail, and the post will find it easier to check that they receive the correct postage for delivering the mail.

Figure 15:
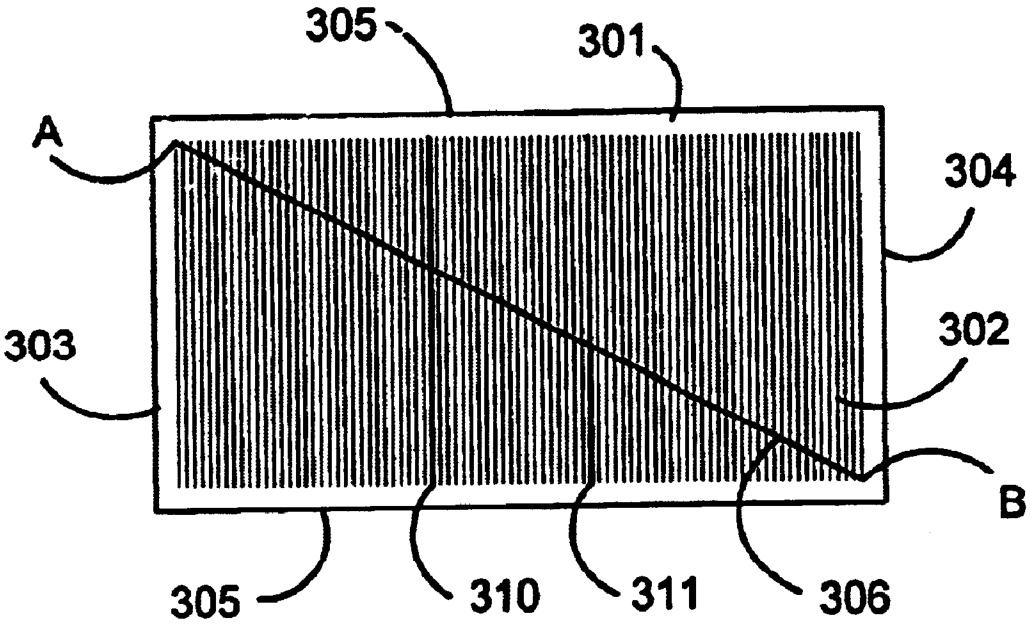
FIG. 15 is a drawing of a top view of a mail tray containing mail pieces that have a pattern in the form of a diagonal line drawn along the top edge of the mail pieces with two rejected mail pieces shown in the tray.

FIG. 15 is a drawing of a top view of a mail tray containing mail pieces that have a pattern in the form of a diagonal line drawn along the top edge of the mail pieces with two rejected mail pieces shown in the tray. Mail tray 301 contains a plurality of mail pieces 302 that are placed in tray 301 in a manner that one of the edges of mail pieces 302, preferably the top edge of mail pieces 302 run along the top of tray 301. Tray 301 has a front panel 303, a back panel 304, and side panels 305 as well as a bottom panel (not shown). Mail pieces 302 have been placed in tray 301 in ordered sequence that was determined by create mail run 9 (FIG. 1). Pattern 306 was drawn on mail pieces 302 by printing device 40 (FIG. 1) in a manner that the first mail piece 302 in the ordered sequence is flush with front panel 303, and the last mail piece in the ordered sequence is flush with back panel 304. Pattern 306 forms a continuous solid diagonal line from point A on the first mail piece next to panel 303 to point B on the mail piece next to panel 304. Lines 310 and 311 are printed, on those mail pieces 302 by printer 40, that are rejected by decision block 505 of FIG. 10. When a mail piece 302 is rejected and marked, a line 310 or 311 is printed along its entire edge. An operator may remove the rejected mail piece, reprint a corrected mail piece, and place the corrected mail piece in the position of the removed mail piece. Hence, mail pieces 302 are in the same sequence order that was determined by create mail run 9.

Figure 16:
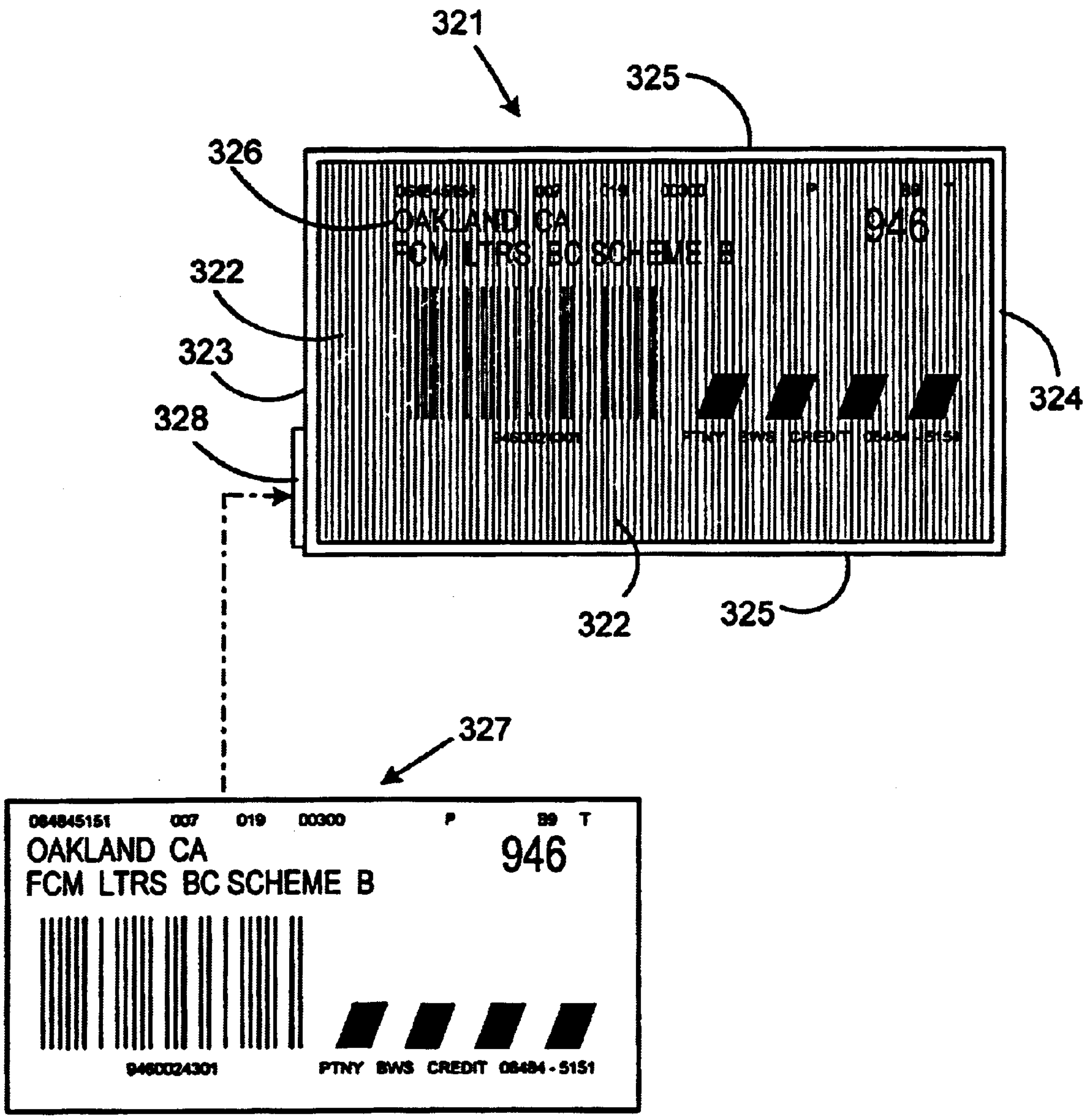
FIG. 16 is a top view of a mail tray containing mail pieces that have a pattern in the form of a tray label drawn along the top edge of the mail pieces. a FIG. 17 is a top view of a mail tray containing mail pieces that have a pattern in the form of a diagonal line and a tray label drawn along the top edge of the mail pieces.

FIG. 16 is a top view of a mail tray containing mail pieces that have a pattern 326 in the form of a tray label drawn along the top edge of the mail pieces. Mail tray 321 contains a plurality of mail pieces 322 that are placed in tray 320 in a manner that one of the edges of mail pieces 322, preferably the top edge of mail pieces 322, run along the top of tray 320. Tray 320 has a front panel 323, a back panel 324, and side panels 325 as well as a bottom panel (not shown). Mail pieces 322 have been placed in tray 320 in ordered sequence that was determined by create mail run 9 (FIG. 1). Pattern 326 in the form of the information contained in tray label 327 was drawn on mail pieces 322 by printing device 40 (FIG. 1) in a manner that the first mail piece 322 in the ordered sequence is flush with front panel 323, and the last mail piece in the ordered sequence is flush with back panel 324. Tray label 327 is placed in tray label holder 328. Hence, mail pieces 322 are in the same sequence order that was determined by create mail run 9.

Figure 17:
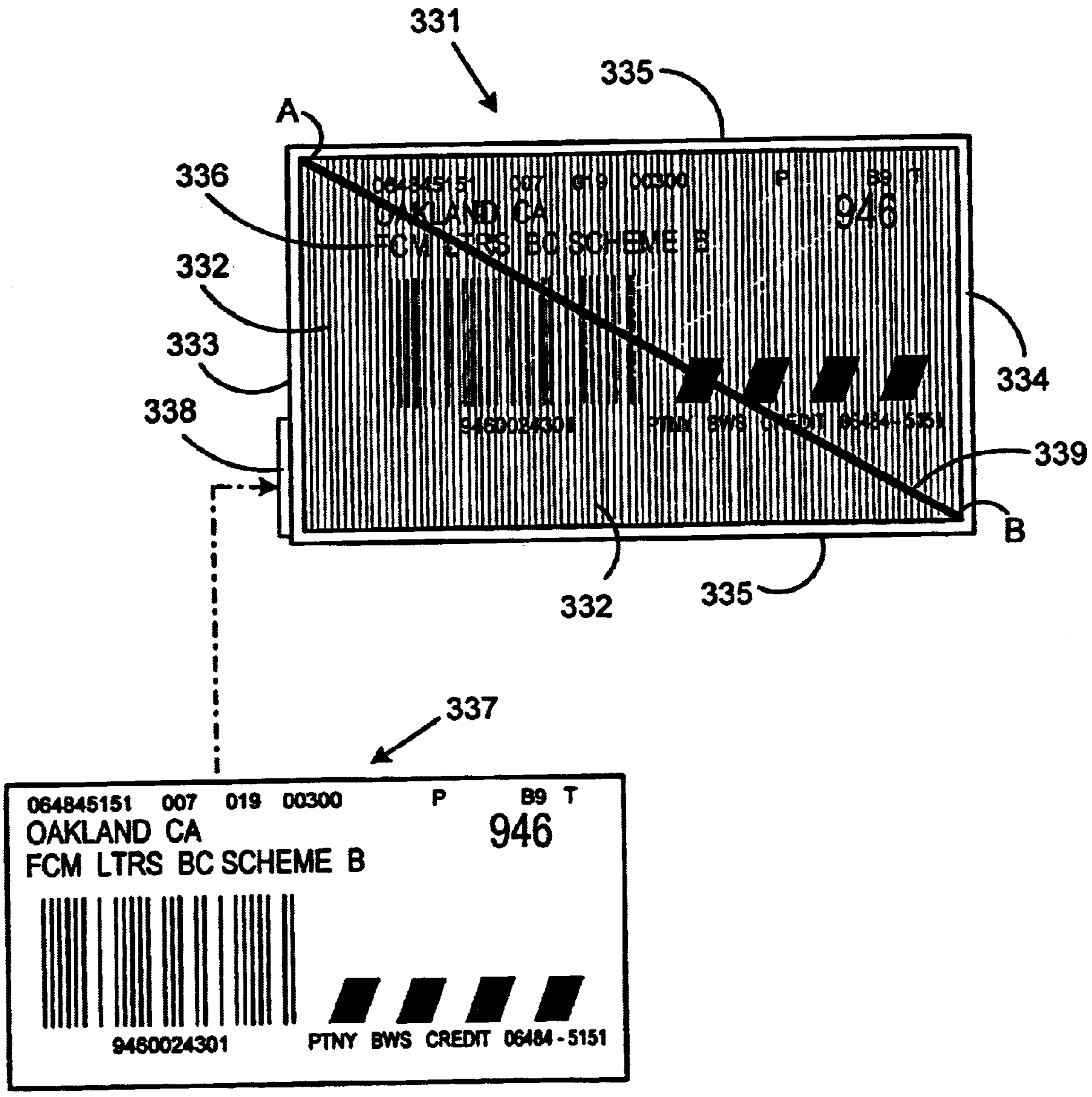

FIG. 17 is a top view of a mail tray containing mail pieces that have a pattern in the form of a diagonal line 339 and a tray label 336 drawn along the top edge of the mail pieces. Mail tray 331 contains a plurality of mail pieces 332 that are placed in tray 331 in a manner that one of the edges of mail pieces 332, preferably the top edge of mail pieces 332, run along the top of tray 331. Tray 331 has a front panel 333, a back panel 334, and side panels 335 as well as a bottom panel (not shown). Mail pieces 332 have been placed in tray 331 in ordered sequence that was determined by create mail run 9 (FIG. 1). Pattern 336, in the form of the information contained in tray label 337, was drawn on mail pieces 322 by printing device 40 (FIG. 1) in a manner that the first mail piece 332 in the ordered sequence is flush with front panel 333, and the last mail piece in the ordered sequence is flush with back panel 334. Pattern 329 was drawn on mail pieces 332 by printing device 40 (FIG. 1) in a manner that the first mail piece 332 in the ordered sequence is flush with front panel 333, and the last mail piece in the ordered sequence is flush with back panel 334. Pattern 339 forms a continuous solid diagonal line from point A on the first mail piece next to panel 333 to point B on the mail piece next to panel 334. Tray label 337 is placed in tray label holder 338. Hence, mail pieces 332 are in the same sequence order that was determined by create mail run 9.

The above specification describes a new and improved method for determining the integrity of mail pieces placed in a tray. It is realized that the above description may indicate to those skilled in the art additional ways in which the principles of this invention may be used without departing from the spirit. It is, therefore, intended that this invention be limited only by the scope of the appended claims.

What is claimed is:

1. A method for determining the integrity of mail pieces placed in trays, said method comprising the steps of:

determining the measurement of an edge of each mail piece that will be placed in a tray;

determining the thickness of each mail piece that will be placed in the tray;

determining the number of mail pieces that will be placed in the tray;

calculating an incremental pattern dab that is going to be placed on the edge of each mail piece;

placing a portion of the pattern on the edge of each mail piece that is going to form the mail pieces of the tray; and placing the mail pieces in the tray in an ordered manner so that the edges having dabs will be visible, and the dabs will form a pattern that indicates only the determined number of mail pieces are in the tray.

2. The method claimed in claim 1, wherein dabs are placed on the top edge of each mail piece.

3. The method claimed in claim 1, wherein the incremental pattern dab on the mail pieces form a diagonal line that goes from the top left edge of the first mail piece in the tray to the bottom right edge of the last mail piece in the tray.

4. The method claimed in claim 3, wherein the diagonal line varies in thickness from the top left edge of the first mail piece in the tray to the bottom right edge of the last mail piece in the tray.

5. The method claimed in claim 1, wherein the incremental pattern dab on the mail pieces form a continuous pattern.

6. The method claimed in claim 1, wherein the incremental pattern dab on the mail pieces forms a pattern on the mail pieces that will enable an observer to determine that one or more mail pieces was added to the tray.

7. The method claimed in claim 1, wherein the incremental pattern dab on the mail pieces forms a pattern on the mail pieces that will enable an observer to determine that one or more mail pieces was removed from the tray.

8. The method claimed in claim 1, wherein the incremental pattern dab on the mail pieces form one or more lines that go from the top left edge of the first mail piece in the tray to the bottom right edge of the last mail piece in the tray.

9. The method claimed in claim 7, wherein the lines vary in thickness from the top left edge of the first mail piece in the tray to the bottom right edge of the last mail piece in the tray.

10. The method claimed in claim 1, wherein the step of calculating the incremental pattern dab on the mail pieces further includes the step of:

scaling the incremental pattern dab to the measurement of the edges of the mail pieces in the tray.

11. The method claimed in claim 1, wherein the incremental pattern dab on the edges of the mail pieces indicates the destination of the tray.

12. The method claimed in claim 11, wherein the incremental pattern dab is human-readable.

13. The method claimed in claim 12, wherein the incremental pattern dab is machine-readable.

14. The method claimed in claim 1, further including the step of:

printing an incremental pattern dab on the edges of the mail pieces that indicates the destination of the tray.

15. The method claimed in claim 12, wherein the incremental pattern dab printed on the edges of the mail pieces is printed in human readable form.

16. The method claimed in claim 12, wherein the incremental pattern dab printed on the edges of the mail pieces is printed in machine-readable form.

17. The method claimed in claim 1, further including the step of:

printing an identifying mark on rejected mail pieces.

18. The method claimed in claim 17, further including the step of:

removing rejected mail pieces from the mail tray.

19. The method claimed in claim 14, further including the step of:

replacing rejected mail pieces with corrected mail pieces.

* * * * *